United States Patent Office 3,553,144
Patented Jan. 5, 1971

3,553,144
PAINT STRIPPING COMPOSITION
AND METHOD
Donald P. Murphy, Roseville, Mich., assignor to Hooker Chemical Corporation, Niagara Falls, N.Y., a corporation of New York
No Drawing. Filed Nov. 29, 1967, Ser. No. 686,718
Int. Cl. C11d 7/06
U.S. Cl. 252—158
3 Claims

ABSTRACT OF THE DISCLOSURE

An alkaline paint stripping composition comprising one or more alkaline materials such as alkali metal hydroxides, carbonates, phosphates, silicates, and an accelerating composition which contains alkylene glycol monophenyl ether and phenol or a substituted phenol. Various substituted phenols may be utilized in the composition, such as p-tertiarybutyl phenol, p-chloro-o-benzyl phenol and tetrachlorophenol. Desirably, the alkaline composition is dissolved in water, in amounts within the range of about 0.5 to 5 pounds per gallon and the resulting aqueous solution was applied to the painted substrate for a period sufficient to effect substantial loosening of the paint coating.

---

This invention relates to a composition and method for removing protective coatings from surfaces and more particularly it relates to a novel additive material for increasing the effectiveness of alkaline stripping compositions.

It is commonly the practice to provide various substrates with protective and/or decorative coatings. These coatings include paints, varnishs, lacquers, enamels, and the like and are formulated from numerous and diverse components, including acrylic resins, alkyd resins, epoxy resins, vinyl resins, and the like. As improvements in adhesions and durability of these coatings have been made, their removal after they have been applied, cured, and/or dried, has become increasingly difficult. Frequently, particular difficulties have been encountered when using chemical means to effect removal of such coatings. It has, therefore, become necessary to subject the coated substrates to the action of increasingly stronger chemical compositions for longer periods of time in order to effect removal of the coating. In many instances, the coating removal or stripping compositions used have had to be of a sufficient strength and/or used for a sufficiently long period of time that there has been an appreciable attack on the substrate to which the coatings are applied. This has been found to be particularly true in the case of coated aluminum articles. Additionally, however, even in the absence of attack on the substrate, the long contact times required to effect loosening of the coatings have often been uneconomical.

In order to overcome these difficulties, it has been proposed to add various substituted phenols to the alkaline stripping compositions, in order to enhance their coating removal properties, without producing undue attack on the substrate. In many instances, however, the substituted phenols used have not been soluble in the alkaline stripping solutions and thus, distill off when the solutions are heated.

It is, therefore, an object of the present invention to provide an improved composition for the removal of protective and/or decorative coatings from substrates to which they have been applied.

Another object of the present invention is to provide an improved coating removal composition, which composition is effective in removing protective and/or decorative coatings in a relatively short time without adverse effect upon the substrate to which the coating is applied.

A further object of the present invention is to provide an improved method for removing coatings from substrates to which they have been applied, which method may be carried out in a relatively short period of time without adverse affect on the substrate itself.

These and other objects will become apparent to those skilled in the art from the description of the invention which follows.

Pursuant to the above objects, the present invention includes a composition useful in removing protective films, which comprises an alkaline composition and an accelerating amount of an accelerator composition, which accelerator composition comprises a phenol and an alkylene glycol monophenyl ether. Broadly, the present invention includes both an aqueous alkaline solution, containing the above composition which is useful as an aqueous paint stripping material, as well as an alkaline concentrate which concentrate may or may not contain water, and which may be diluted with water to form an aqueous stripping solution having the desired concentration. These aqueous stripping solutions are found to give excellent results in removing or substantially loosening decorative and/or protective films, such as paint, lacquers, varnishes, enamels, and the like, from metal surfaces to which they have been applied. They have been found to be particularly effective in removing such coating materials which contain acrylic, epoxy, vinyl, or alkyd resin coating components.

More specifically, the concentrate material of the present invention contains an alkaline composition, which alkaline composition is present in an amount of at least about 20% by weight of the concentrate. Desirably, the alkaline composition constitutes from about 70 to 93% by weight of the concentrate composition.

Various alkaline materials may be utilized in the concentrate composition to provide the desired alkalinity, including alkali metal hydroxides, alkali metal carbonates, alkali metal silicates, alkali metal phosphates, and the like. Of these, the sodium compounds are preferred, such as sodium hydroxide, sodium carbonate, sodium silicates, mono-, di-, and trisodium phosphates, tetrasodium pyrophosphate, sodium tripolyphosphate, and the like. It will be appreciated, however, that in some instances, similar compounds of the other alkali metals, such as potassium, lithium, cessium, or rubidium, may also be used. Desirably, these alkaline materials are used in combination, the choice of the particular alkaline materials used and their specific amounts, depending upon the properties which are desired in the alkaline stripping solutions formulated from the concentrate. Typically, the alkali metal hydroxides may be present in amounts up to about 90% by weight of the concentrate composition, while the other alkaline materials such as the carbonates, silicates and phosphates, are typically present in amounts up to about 60% by weight of the alkaline concentrate composition. It will, of course, be appreciated that in each instance, the total of the alkaline materials in the concentrate composition will be within the desired ranges as has been indicated hereinabove.

The alkaline concentrate composition of the present invention also contains an accelerating composition, in addition to the alkaline materials as has been described. This accelerating composition comprises phenol or a substituted phenol and an alkylene glycol monophenyl ether. In addition to phenol itself, various substituted phenols may be used in this composition, which substituted phenols are of the type shown by the following structural formula:

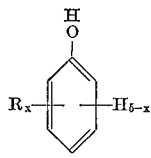

wherein R is selected from the group consisting of halogen, aryl groups which contain 6 to 10 carbon atoms, lower alkyl and alkoxy groups having from 1 to 6 carbon atoms and alkaryl and aralkyl groups, the alkyl portion of which contain 1 to 6 carbon atoms and the aryl portion of which contains 6 to 10 carbon atoms and wherein $x$ is a number from 1 to 5. Typical of preferred substituted phenols falling within this group are p-tertiary butyl phenol, p-chloro-o-benzylphenol, and the tetrachlorophenols. Other suitable phenols of the above type which may also be used include p-chlorophenol, o-fluorophenols, p-bromophenol, p-tertiaryhexylphenol, p-benzylphenol, m-ethylphenol, o-propylphenol, o,p-dipentylphenol, o-methoxyphenol, and the like. Desirably, phenol or the substituted phenol is present in the alkaline concentrate composition in amounts within the range of about 1 to 40% by weight of the concentrate with amounts within the range of about 10 to 20% by weight of the concentrate being preferred.

The alkylene glycol monophenyl ethers used are the type:

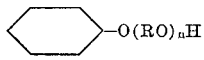

wherein R is an alkylene radical and $n$ has an average value of at least 1, and is preferably 1 to 2. Preferably, these ethers contain a total of at least 7 carbon atoms and the alkylene radical preferably contains from about 2 to about 6 carbon atoms. Various alkylene glycol monophenyl ethers can be used in the accelerating composition of the present invention, including ethylene glycol monophenyl ether, propylene glycol monophenyl ether, butylene glyco monophenyl ether, diethylene glycol monophenyl ether, dipropylene gylcol monophenyl ether, and the like. Of these the preferred is the ethyleneglycol monophenyl ether, and for this reason hereinafter primary reference will be made to this material.

The ethylene glycol monophenyl ether is present in the composition in an amount at least sufficient to solubilize the substituted phenol in the aqueous alkaline paint stripping composition, formulated from the alkaline concentrate. It is to be appreciated, that the ethylene glycol monophenol ether may be incorporated with the phenol in the concentrate composition. Where this is done, it is desirably present in an amount within the range of about 2 to 40 percent by weight of the alkaline composition, with amounts within the range of about 10 to 20 percent by weight being preferred. Alternatively, if desired, the ethylene gycol monophenyl ether may be added separately to the aqueous paint stripping composition which has been formulated from the alkaline concentrate material. Where this is done, the ethylene gylcol monophenyl ether is desirably added to the aqueous paint stripping solution in an amount within the range of about 0.5 to 10 percent by volume of the solution, with amounts within the range of about 1 to 3% by volume being preferred.

In addition to the components indicated hereinabove, the concentrate compositions of the present invention may also include a gluconic acid material. Such material is typically present in the composition in an amount up to about 10% by weight of the composition, with amounts within the range of about 2 to 7% by weight of the composition being preferred. It is to be understood that by the term "gluconic acid material" it is intended to refer to and include gluconic acid itself, water soluble and/or water dispersable forms of gluconic acid, such as the alkali metal gluconates and in particular sodium gluconate, glucono-delta-lactone, and the like.

Surface active or wetting agents may also be included in the concentrate composition, typically in amounts up to about 10% by weight of the composition, with amounts within the range of about 0.1 to 7% by weight of the composition being preferred. Various suitable surface active agents of the anionic, nonionic and cationic types may be used, provided they are soluble and effective in the alkaline stripping solutions. In many instances, excellent results have been obtained when using wetting or surface active agents of the phosphate ester type and, accordingly, these materials are preferred. Additionally sulfated fatty acid derivatives and sulfated fatty acid amide derivatives, as described in U.S. Pats. 2,528,378 and 2,773,068, as well as sulfated alcohols, such as the sodium sulfate derivative of 2-ethylhexanol may also be used.

Other adjuvants which may be included in the concentrate compositions of the present invention include rinsing or dispersing agents, such as lignin sulfonates, as well as materials to impart a pleasant odor to the stripping composition, such as pine oil, and the like. Typically, these materials are present in the concentrate composition in amounts up to about 10% by weight of the composition.

In formulating the aqueous alkaline paint stripping compositions of the present invention, the alkaline concentrate material, as described above, is dissolved in water in amount sufficient to provide the desired alkalinity to effect substantial loosening of the paint or other films to which the composition is applied. Typically, the aqueous alkaline paint stripping compositions of the present invention contain the concentrate compositions in amounts within the range of about 0.5 to 5 pounds per gallon of solution, with amounts within the range of about 1 to 3 pounds per gallon of solution being preferred. As has been previously noted, where the ethylene gylcol monophenyl ether has not been included in the alkaline concentrate material, as part of the accelerating composition, this component will, of course, be added to the aqueous stripping solution in amounts as indicated herinabove. In a most preferred embodiment of the present invention, the aqeuous alkaline paint stripping solution will contain the alkaline concentrate material, without the ethylene glycol monophenyl ether, in an amount of about 1.5 to 2 pounds per gallon and the ethylene glycol monophenyl ether will be added in an amount of about 1 to 2% by volume of the stripping solution.

In utilizing the stripping compositions of the present invention, the aqueous alkaline stripping solution, formulated as has been indicated hereinabove, is brought into contact with the substrate from which it is desired to remove paint or similar protective or decorative coating. The contact time required to effect a substantial loosening of the paint from the substrate will, of course, depend upon the nature and thickness of the paint which is to be removed. In some instances, contact times of a few minutes, e.g., 2 to 3 minutes may be sufficient, while with other and more difficulty removable paints, appreciably longer contact times, e.g., 30 minutes or more, may be desirable. Accordingly, it is not possible to give specific contact times which are used, inasmuch as the contact time utilized will, in each instance, be that which will effect a substantial loosening of the paint on the surface.

In this respect, it is to be noted that it is not essential that the stripping solutions of the present invention remain in contact with the coated substrate for a period sufficient to effect complete removal of the coating from the substrate. It is only necessary that the contact time be sufficient to effect a loosening of the paint or other film on the surface so that it may then be removed by brushing, high pressure water spray, or the like. Generally, it is desirable that the contact between the stripping solution and the substrate from which the coating is to be removed is effected by emmersing the substrate in the stripping solution. In this manner, a thorough and continuous wetting of the substrate by the stripping solution. In this manner, a thorough and continuous wetting of the substrate by the stripping solution is obtained with little or no loss of stripping solution. In some instances, however, particularly when less difficulty removable films are involved, other contacting techniques, such as spraying, flooding, or the like may be used.

Desirably, the paint stripping solution is at an elevated temperature when it is brought into contact with the substrate from which the protective film is to be removed. Preferably, the solution is at a temperature which is close to its boiling point with temperatures within the range of about 90 to 100 degrees centigrade being typical. It will be appreciated, however, that in many instances, either higher or lower temperatures, e.g., room temperature, may also be used.

Once the protective film on the substrate treated has been substantially loosened by contact with the stripping solution and the film has been removed from the substrate, either by retaining the stripping solution in contact with the film until complete removal is obtained or by utilizing other removal techniques on the loosely adhering film, the substrate may then be recoated with a new protective film, if desired. Generally, however, it is preferred that the surface first be water rinsed so as to remove any of the alkaline stripping solution which may still be retained on the surface.

It has been found that by using the aqueous alkaline stripping solution described above, in the manner which has been indicated, greatly improved results are obtained in terms of reduction in the time required to effect a substantial loosening of many different types of protective or decorative film, such as paints, lacquers, varnishes, enamels, and the like. The subject stripping solutions are particularly effective in removing protective and/or decorative films contatining resins of the acrylic, alkyd, epoxy, and vinyl types. Moreover, it is found that by combining the phenol with the alkylene glycol monophenyl ether, solubilization of the phenol in the aqueous alkaline stripping solution is achieved so that the phenol does not steam distill out of the solution when it is heated. Thus, attack of the alkaline stripping solution on the substrate, and particularly on an aluminum substrate, is greatly minimized.

In order that those skilled in the art may better understand the present invention and the manner in which it may be practiced, the following specific examples are given. It is to be understood however, that these examples are merely exemplary of the compositions and process of the present invention and are not to be taken as limiting the invention. In these examples, unless otherwise indicated, temperatures are in degrees centigrade and parts and percent are by weight.

In these examples, the paint to be removed was applied to one inch by four inch aluminum panels which had previously been coated with a conventional chromate conversion paint base coating. Unless otherwise indicated, the paint applied was an acrylic paint the thickness of which on the panels was about 1 mil (1/1000 inch.) The painted panels were then immersed in various stripping solutions to be tested and retained therein until there was a substantially complete removal of the paint film from the panel. The stripping solutions were maintained at about 100 degrees centigrade during the time the panels were immersed therein. In formulating the stripping solutions for test, various alkaline concentrate compositions were dissolved in water in an amount equal to 1.5 pounds per gallon of solution. Additionally, in some instances, ethylene glycol monophenyl ether, hereinafter referred to as EGME for convenience, was also added to the stripping solution. The concentrate compositions used were as follows.

COMPONENTS

Composition A: Percent by weight
Na$_2$SiO$_3$.5H$_2$O _____ 33
Na$_2$HPO$_4$(anhydrous) _____ 30
Sodium silicate having SiO$_2$ to
  Na$_2$O ratio of 3.22:1 _____ 6
Lignin sulfonate rinsing aid _____ 3
Phosphate ester surface active agent _____ 3
p-Tertiary butyl phenol _____ 25

Composition B:
Na$_2$SiO$_3$.5H$_2$O _____ 38
Na$_2$HPO$_4$ (anhydrous) _____ 50
Sodium silicate having SiO$_2$ to Na$_2$O ratio
  of 3.22:1 _____ 7
Lignin sulfonate rinsing aid _____ 3
Phosphate ester surface active agent _____ 2

Composition C:
Na$_2$SiO$_3$.5H$_2$O _____ 33
Na$_2$HPO$_4$ (anhydrous) _____ 31
Sodium silicate having SiO$_2$ to Na$_2$O ratio of
  3.22:1 _____ 6
Lignin sulfonate rinsing agent _____ 3
Phosphate ester surface active agent _____ 2
p-Chloro-o-benzylphenol _____ 25

Composition D:
NaOH _____ 81
Na$_2$CO$_3$ _____ 6
Na$_2$HPO$_4$ (anhydrous) _____ 3
Sodium gluconate _____ 3
Tetrachlorophenol _____ 6
Phosphate ester surface active agent _____ 0.5
Pine oil _____ 0.5

Composition E:
NaOH _____ 87
Na$_2$CO$_3$ _____ 6
Na$_2$HPO$_4$ (anhydrous) _____ 3
Sodium gluconate _____ 3
Phosphate ester surface active agent _____ 0.5
Pine oil _____ 0.5

Using the procedure as set forth hereinabove, the following results were obtained:

| Examples | Stripping solution components | Stripping time (minutes) |
| --- | --- | --- |
| 1 | Composition A | 24.5 |
| 2 | Composition A plus 2% by volume EGME | 16.5 |
| 3 | Composition B plus 2% by volume EGME | [1] 75 |
| 4 | Composition C | 20 |
| 5 | Composition C plus 2% by volume EGME | 17 |
| 6 | Composition A plus 2% by volume tripropylene glycol. | 32 |
| 7 | Composition A plus 2% by volume diethylene glycol monobutyl ether. | 26 |
| 8 | Composition A plus 2% by volume triethylene glycol monoethyl ether. | 33 |
| 9 | Composition A plus 2% by volume ethylene glycol monohexyl ether. | 33 |

[1] 70% removal.

From the above results, it can be seen that where both the phenol and the alkylene glycol monophenyl ether are used in the stripping solutions, there is a significant reduction in the stripping time required, as compared to stripping solutions which contain only one of the phenol or the alkylene glycol monophenyl ether. Additionally, as is shown in Examples 6 through 9, the substitution of various other glycols and glycol alkyl ethers for the alkylene glycol monophenyl ether do not result in the same reduction in stripping time even when they are combined with a phenol.

In the following examples, the acrylic paint was applied over a conventional iron phosphate paint base coating on one inch by four inch steel panels. The removal of this paint film was carried out in accordance with the procedure set forth hereinabove. Using this procedure, the following results were obtained:

| Example | Stripping solution components | Stripping time (minutes) |
|---|---|---|
| 10 | Composition D | 95 |
| 11 | Composition D plus 2% by volume EGME | 6 |
| 12 | Composition E plus 2% by volume EGME | 15 |

The following examples were run using the procedure and test panels of the preceeding Examples 10-12. In these examples, the alkaline solution use was formulated by dissolving sodium hydroxide in water in an amount of 1.5 pounds/ gallon. Various phenol and glycol ester additives were incorporated in this alkaline solution and the time required to obtain substantial loosening of the paint film on the test panels was determined. Using this procedure, the following results were obtained:

| Ex. | Additive | Amount (percent by volume) | Stripping time, minutes |
|---|---|---|---|
| 13 | p-Tertiary butyl phenol | 5 | (¹) |
| 14 | o-Phenyl phenol | 5 | 20 |
| 15 | o-Methoxy phenol | 5 | (¹) |
| 16 | Phenol | 5 | (²) |
| 17 | Ethylene glycol monophenyl ether | 5 | 12 |
| 18 | Propylene glycol monophenyl ether | 5 | (³) |
| 19 | Diethylene glycol monophenyl ether | 5 | 25 |
| 20 | {p-Tertiary butyl phenol / Ethylene glycol monophenyl ether} | 2 / 3 | 6 |
| 21 | {p-Tertiary butyl phenol / Propylene glycol monophenyl ether} | 2 / 3 | 19 |
| 22 | {p-Tertiary butyl phenol / Diethylene glycol monophenyl ether} | 2 / 3 | 15 |
| 23 | {o-Phenylphenol / Ethylene glycol monophenyl ether} | 2 / 3 | 14 |
| 24 | {o-Phenyl phenol / Propylene glycol monophenyl ether} | 2 / 3 | 15 |
| 25 | {o-Phenyl phenol / Diethylene glycol monophenyl ether} | 2 / 3 | 10 |
| 26 | {o-Methoxy phenol / Ethylene glycol monophenyl ether} | 2 / 3 | 6.75 |
| 27 | {o-Methoxy phenol / Propylene glycol monophenyl ether} | 2 / 3 | 13 |
| 28 | {o-Methoxy phenol / Diethylene glycol monophenyl ether} | 2 / 3 | 11 |
| 29 | {Phenol / Ethylene glycol monophenyl ether} | 2 / 3 | 8 |

¹ No effect in 20 minutes.
² No effect in 30 minutes.
³ 70% removal in 30 minutes.

While there have been described various embodiments of the invention, the compositions and methods described are not intended to be understood as limiting the scope of the invention as changes therein are possible and it is intended that each element recited in any of the following claims is to be understood as referring to all equipment elements for accomplishing substantially the same results in substantially the same or equivalent manner, it being intended to cover the invention broadly in whatever form its principle may be utilized.

What is claimed is:

1. A concentrate composition, useful in formulating aqueous film-removing compositions, which consist essentially of from about 20% to 98% by weight of an alkaline material selected from alkali metal hydroxides, alkali metal carbonates, alkali metal silicates and alkali metal phosphates, from about 1% to 40% by weight of p-tertiary butyl phenol and from about 1% to 40% by weight of ethylene glycol monophenyl ether.

2. An aqueous film removing composition which consists essentially of an aqueous solution of the concentrate composition as claimed in claim 1, which concentrate composition is present in an amount within the range of about ¼ to 5 pounds per gallon of the aqueous composition.

3. A method of removing paint and similar protective films from the surface of an article which comprises contacting the article from which the film is to to be removed with the aqueous film removing composition as claimed in claim 2 and maintaining the aqueous composition in contact with the surface for a period sufficient to effect a substantial loosening of the protective film on the surface.

References Cited

UNITED STATES PATENTS

| | | | |
|---|---|---|---|
| 2,971,918 | 2/1961 | Goldsmith et al. | 212—156X |
| 2,971,919 | 2/1961 | Goldsmith | 252—139 |
| 3,179,609 | 4/1965 | Morison | 134—38X |
| 3,284,365 | 11/1966 | Bourean et al. | 252—156 |

MAYER WEINBLATT, Primary Examiner

A. RADY, Assistant Examiner

U.S. Cl. X.R.

134—38; 252—156, 162, 170